Patented Aug. 11, 1936

2,050,803

UNITED STATES PATENT OFFICE 2,050,803

DEPHOSPHORIZING TREATMENT OF METAL IN A CONVERTER

René Perrin, Paris, France, assignor to Societe d'Electrochimie, d'Electrometallurgie et des Acieries Electriques d'Ugine, Paris, France, a corporation of France No Drawing. Application July 20, 1934, Serial No. 736,262. In Italy and Australia August 31, 1931

13 Claims. (Cl. 75—52)

In my patent applications Ser. No. 584,584, filed Jan. 2nd, 1932 and Ser. No. 658,275 filed Feb. 23rd, 1933, I have described a process for dephosphorizing steel which consists in violently intermixing the steel to be treated with a molten fluid dephosphorizing slag, the violence of this intermixing being such as to distribute the slag in a state of minute subdivision throughout the metal so that an emulsion-like mixture is produced, and to form a turbulent mass of the thus intimately intermixed metal and slag.

Under these conditions the dephosphorizing reactions are almost instantaneous due to the thorough and intimate intermixing of the molten slag and metal and to the violent movement of the mass, so that in an extremely short time the phosphorous to be eliminated from the steel is taken up in the dephosphorizing slag.

In the above mentioned patent applications I have described several methods of effecting the violent intermixing of metal and slag, namely the method of causing an impact of the body of molten metal with the bath of fluid dephosphorizing slag, e. g. by pouring the molten metal in a thick jet and from sufficient height upon the slag.

In my above mentioned applications, I have also mentioned the possibility of using gaseous means for violently intermixing metals and slags.

The present application, which is directed more specifically to a process for dephosphorizing steel in a converter in which the metal and slag are violently intermixed by gaseous means, is a continuation-in-part of my above mentioned applications Ser. No. 584,584, filed January 2nd, 1932, and Ser. No. 658,275, filed February 23rd, 1933. Nevertheless it is in part directed to a process for obtaining in a converter, from a phosphorus pig iron, steel relatively poor in iron oxide, by means of a violent intermixing of a slag with the steel formed at a certain stage of the operation.

According to the improved process, which forms the subject-matter of the present application, steel to be dephosphorized is violently intermixed in a converter with fluid dephosphorizing slag by resuming the blowing for a short period of time, after stopping the normal blowing, removal of the slag formed in the converter, and charging dephosphorizing slag, to be violently intermixed in a molten condition with the steel.

Thus my process according to the present application essentially comprises the following steps:

(a) blowing in the converter in the usual way to transform pig iron into steel and to effect partial dephosphorization, and slagging off;

(b) charging on a fluid dephosphorizing slag substantially free from phosphorus;

(c) resuming the blowing in the converter for a short period of time.

This new process, which is intended to be used more particularly for operations in the basic converter, is carried out preferably by operating as follows:

Towards or at the end of the normal operation in the converter, when the steel formed contains only a relatively small quantity of phosphorus, the slag which is formed during the operation is removed, and is replaced by a synthetic molten very fluid dephosphorizing slag containing little or no phosphorus. Then a violent and intimate intermixing of this slag with the metal is produced by introduction of air in a supplementary blowing of short duration, say about 15 to 30 seconds for example.

Such violent intermixing has for its effect that almost immediately a turbulent mass of steel and slag intermixed in a finely divided condition is produced; the steel so violently intermixed with the slag tends to come into equilibrium with this slag and thus the phosphorus contained in the steel is bound substantially instantaneously by the dephosphorizing slag.

It may be also emphasized that during the first blowing step, as phosphorus is substantially eliminated, a substantial amount of FeO is simultaneously formed in the steel. During the second blowing step, after slagging off and charging the fresh slag, some of the FeO present in the steel is reduced by the phosphorus of the steel and the amount of FeO in the steel is minimized.

The novelty of my invention resides in the fact that, due to the employment, after slagging off, of a dephosphorizing slag in a molten condition and very poor in phosphorus, it is possible by a supplementary blowing of short duration, rapidly to produce the equilibrium between this slag and the metal, due to the violent intermixing produced between molten slag and metal by this blowing, and this without the oxidizing action of the air blast itself intervening to a perceptible extent so as to produce oxidation of the phosphorus, or being predominant with respect to the action of the slag. The supplementary air blast in fact does not act substantially as an oxidizing reagent for oxidizing the phosphorus, but only as a mechanical agent producing the violent intermixing of slag and metal.

Thus, due to this violent intermixing produced by the short reblowing in the presence of a fluid dephosphorizing slag, the impurity constituted by the phosphorus is extracted to a large extent, and as a final product there is obtained a metal having a lower content of phosphorus than the starting metal obtained in the converter and containing less iron oxide than that metal.

In fact, according to the invention the losses of iron are decreased to a great extent, while in the usual known processes in which a basic converter is employed, considerable oxidation of the bath occurs without any advantage whatever.

The process according to the invention may be applied for obtaining steels with a low phosphorus content. The treatment may be repeated if desired and similar results are obtained with regularity and certainty by means of determined quantities of fluid dephosphorizing slag.

The slag may be an oxidizing basic slag analogous to that described in my application Ser. No. 584,584 so that, due to the violent intermixing of slag and metal when resuming the blowing in the converter, the phosphorus to be eliminated from the steel almost instantly combines with the oxygen of the oxidizing body contained in the slag and with the base of said slag.

As an example of carrying out the process when using a fluid oxidizing basic slag, about 12 metric tons of metal containing:

C=3.4%
Si=0.4%
P=1.7%
Mn=1.4% were charged in a basic retort, and the normal blowing treatment was effected. Then the phosphorized slag formed during this operation in the retort was removed by a slagging off of about 12 minutes duration.

At this moment the tests made on the metal and on the removed slag indicated the following analysis:

| Steel | Slag |
|---|---|
| C=0.025% | $SiO_2$=7% |
| Si=0.03% | FeO=13.8% |
| Mn=0.210% | MnO=6.1% |
| P=0.041% | $P_2O_5$=15.2% |
|  | CaO=54% |
|  | MgO=2.1% |

After removal of said slag, about 350 kgs. of a fresh molten and very fluid slag containing:

$SiO_2$=4%
CaO=66%
FeO=19%
and fluorspar were poured upon the steel in the retort.

In the presence of this slag, according to the invention the blast was resumed for about 30 seconds, which produced a violent intermixing of the mass of steel and oxidizing basic slag.

At the end of this supplementary blowing, a test showed that the phosphorus content of the steel had fallen to

P=0.014%.

Thus, in an extremely short time, due to the violent intermixing of slag and metal, 2/3 of the phosphorus contained in the steel after the normal Thomas operation were eliminated.

It has also been found according to my invention, that the dephosphorization of steel, more particularly of oxidized steel containing but relatively little phosphorus (e. g. between 0.03 and 0.07%) can be successfully effected by violently intermixing the said steel, in the converter after usual blowing and slagging-off, with a previously molten fluid basic non-oxidizing slag, i. e. a fluid basic slag containing little or no iron oxide, analogous to that described in my application above mentioned Ser. No. 658,275.

When charging on such a slag and quickly resuming the blowing in the manner above described, the phosphorus to be eliminated from the steel combines almost instantaneously with the oxygen of the iron oxide contained in the metal bath and with the base of said slag.

The process in this case is carried out preferably by operating as follows:

Towards or at the end of the normal blowing treatment in the converter, that is to say at a time when the steel is already notably oxidized, the slag formed during the operation is completely removed and is replaced by a basic, synthetic, previously molten very fluid slag containing little or no oxidizing body and containing little or no phosphorus. Then an intense and violent intermixing of this slag with the metal is produced in the manner above described, e. g. by introduction of air in a supplementary blowing of extremely short duration.

During this supplementary blowing, the metal violently intermixed with the slag tends to come into equilibrium therewith. In an extremely short time the phosphorus contained in the steel is combined with the oxygen of the iron oxide contained in the metallic bath and with the base of the slag. The slag, due to its basic nature, absorbs the $P_2O_5$ which is present in traces in the metal bath, which permits the reaction of oxidation of the phosphorus to be produced and to be carried out at the expense of the iron oxide itself dissolved in the metal. At the same time a distribution of the iron oxide takes place between the slag and the metal, and finally the reaction of oxidation of the phosphorus stops when the equilibrium between the iron oxide of the slag, the $P_2O_5$ of the slag, and the phosphorus of the metal is established.

Obviously it is not necessary to start with finished Thomas metal, and the Thomas operation may if desired be stopped before the end of the normal blowing and the present process be then applied, but it is necessary in any case that the metal shall comprise sufficient iron oxide still to permit the elimination of a considerable quantity of phosphorus in the presence of the slag which it is desired to employ. By way of example, at the end of a normal Thomas operation carried out upon 12 metric tons of metal, the metal contained 0.038 of phosphorus and 0.040 of carbon which indicates that its degree of oxidation was fairly high. The slag formed during the operation was removed, and upon the metal there was poured 1000 kgs. of a fluid previously molten slag containing 16% of silica and 9% of alumina, the rest being lime and magnesia. In the presence of this slag the blowing was resumed for about 20 seconds; at the end of this blowing the phosphorus content has fallen to 0.017%.

Owing to the operating method in question, a steel such as fine steel having a very low phosphorus content, can be obtained.

What I claim is:

1. A process for dephosphorizing steel in a converter, which comprises a first-blowing step, stopping the blowing, allowing the formed slag to collect at the top of the metal bath, slagging off, charging in the converter a molten fluid dephosphorizing slag, resuming the blowing in the converter for a short period of time so that a speedy, intimate and turbulent admixture of steel and slag takes place and thereby quickly effecting the dephosphorization of the steel, and running the dephosphorized steel out of the converter.

2. A process for dephosphorizing a determined quantity of steel in a converter which consists in subjecting the steel to a first air-blowing and thereby effecting a partial dephosphorization of the said quantity of steel, stopping the blowing, allowing the formed phosphorized slag to collect at the top of the steel bath, removing by slagging off substantially the whole mass of said phosphorized slag, then bringing into contact in the converter with the said partially dephosphorized steel a fresh dephosphorizing slag acting in a molten fluid condition on said steel, and resuming the blowing in the converter for a short period of time so that a speedy, intimate and turbulent admixture of the said steel and slag takes place thereby quickly effecting a further far reaching dephosphorization of the said quantity of steel, and running the so dephosphorized steel out of the converter.

3. A process for dephosphorizing steel in a converter, which comprises a first-blowing step, stopping the blowing, allowing the formed slag to collect at the top of the metal bath, slagging off, charging in the converter a molten fluid dephosphorizing slag out of equilibrium with the steel, resuming the blowing in the converter for a short period of time so as to intermix the steel and slag with such violence and intimacy that a metal-slag equilibrium takes place throughout the bath with such rapidity that a high speed dephosphorization of the steel is obtained, and running the dephosphorized steel out of the converter.

4. A process for dephosphorizing a metal in a converter, which comprises a first-blowing step, stopping the blowing, slagging off, charging in the converter a molten fluid dephosphorizing slag, resuming the blowing for a short period of time and running the dephosphorized metal out of the converter.

5. A process for extracting oxidizable impurities out of a determined quantity of metal in a converter which consists in subjecting the metal to a first air-blowing and thereby effecting a partial removal of said oxidizable impurities from the said quantity of metal, stopping the blowing, allowing the formed slag charged with such impurities to collect at the top of the metal bath, removing by slagging off substantially the whole mass of the said slag, then bringing into contact in the converter with the said partially purified metal a basic oxidizing slag poor in the impurities to be extracted out of the metal, acting in a molten fluid condition on the metal, and resuming the blowing for a short period of time so that a speedy, intimate and turbulent admixture of said metal and slag takes place and thereby quickly effecting a further far reaching extraction of the said oxidizable impurities out of the said quantity of metal, and running the so purified metal out of the converter.

6. A process for dephosphorizing steel in a basic converter, which comprises a first-blowing step to effect partial dephosphorization of the steel, stopping the blowing, allowing the phosphorized slag to collect at the top of the metal bath, slagging off, charging in the basic converter a molten fluid dephosphorizing slag, resuming the blowing in the converter for a short period of time so that a speedy, intimate and turbulent admixture of steel and slag takes place and thereby quickly effecting the dephosphorization of the steel, and running the dephosphorized steel out of the basic converter.

7. A process for dephosphorizing steel in a converter, which comprises a first-blowing step, stopping the blowing, allowing the formed slag to collect at the top of the metal bath, slagging off, charging in the converter a molten fluid basic slag containing a substantial amount of iron oxide but little phosphorus, resuming the blowing for a short period of time so that a speedy, intimate and turbulent admixture of steel and slag takes place and thereby quickly effecting the dephosphorization of the steel, and running the dephosphorized steel out of the converter.

8. A process for dephosphorizing steel in a converter, which comprises a first-blowing step, stopping the blowing, allowing the formed slag to collect at the top of the metal bath, slagging off, charging in the converter a molten fluid oxidizing basic slag containing substantially no phosphorus, resuming the blowing for a short period of time so that a speedy, intimate and turbulent admixture of steel and slag takes place and thereby quickly effecting the dephosphorization of the steel, and running the dephosphorized steel out of the converter.

9. A process for dephosphorizing steel in a converter, which comprises a first blowing step producing oxidation of the steel, stopping the blowing, allowing the formed slag to collect at the top of the metal bath, slagging off, charging in the converter a molten fluid basic slag poor in phosphorus and containing little oxidizing body, resuming the blowing for a short period of time so that a speedy, intimate and turbulent admixture of steel and slag takes place and thereby quickly effecting the dephosphorization of the steel, and running the dephosphorized steel out of the converter.

10. A process for dephosphorizing steel in a converter, which comprises a first-blowing step producing oxidation of the steel, stopping the blowing, allowing the formed slag to collect at the top of the metal bath, slagging off, charging in the converter a molten fluid basic slag, poor in phosphorus and containing substantially no iron oxide, resuming the blowing for a short period of time so that a speedy, intimate and turbulent admixture of steel and slag takes place and thereby quickly effecting the dephosphorization of the steel, and running the dephosphorized steel out of the converter.

11. A process for dephosphorizing steel in a converter, which comprises a first blowing step producing oxidation of the steel, stopping the blowing, allowing the formed slag to collect at the top of the metal bath, slagging off, charging in the converter a molten fluid basic slag poor in phosphorus and containing little oxidizing body, resuming the blowing for a short period of time so as to intermix the slag and oxidized steel with such violence that phosphorus contained in the steel substantially instantaneously is taken up in the slag by combination with iron oxide contained in the steel and with the base of the slag and running the dephosphorized steel out of the converter.

12. A process for dephosphorizing steel which comprises blowing the steel in a basic converter to partially remove the phosphorus and introduce a considerable quantity of iron oxide into the steel, stopping the blowing, allowing the phosphorized slag to collect at the top of the metal bath, slagging off, charging in the converter a molten fluid dephosphorizing slag poor in iron oxide and resuming the blowing for a short period of time so as to intermix the said slag and steel with such violence and intimacy that a substantially complete dephosphorization and a partial deoxidation of the steel quickly takes place, and running the steel out of the converter.

13. A process for obtaining from a phosphorus pig iron a steel relatively poor in iron oxide which comprises blowing the pig iron for such a period of time as to remove a substantial amount of phosphorus out of the formed steel whilst still keeping some phosphorus in the steel, stopping the blowing, allowing the phosphorized slag to collect at the top of the bath, slagging off, charging in the converter a molten fluid basic slag poor in iron oxide and in phosphorus and resuming the blowing for such a short period of time and with such a violence that the phosphorus remaining in the steel quickly reduces a portion of the FeO present in the steel, and running the steel out of the converter.

RENÉ PERRIN.